United States Patent
Wang et al.

(10) Patent No.: US 10,073,608 B2
(45) Date of Patent: Sep. 11, 2018

(54) USER INTERFACE

(75) Inventors: Wei Wang, Beijing (CN); Kongqiao Wang, Beijing (CN); Xiaohui Xie, Beijing (CN); Yingfei Liu, Beijing (CN); Xia Wang, Beijing (CN); Huanglingzi Liu, Beijing (CN); Bin Wang, Shanghai (CN); Zhen Liu, Tarrytown, NY (US); Yuezhong Tang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 720 days.

(21) Appl. No.: 13/579,453

(22) PCT Filed: Mar. 8, 2010

(86) PCT No.: PCT/CN2010/070914
§ 371 (c)(1),
(2), (4) Date: Aug. 16, 2012

(87) PCT Pub. No.: WO2011/109931
PCT Pub. Date: Sep. 15, 2011

(65) Prior Publication Data
US 2012/0317515 A1    Dec. 13, 2012

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 1/1626* (2013.01); *G06F 3/0482* (2013.01); *G06F 2200/1637* (2013.01)

(58) Field of Classification Search
CPC .............. G06F 3/0482; G06F 1/1694; G06F 2200/1637; G06F 3/0488; G06F 3/167;
(Continued)

(56) References Cited

U.S. PATENT DOCUMENTS 6,795,097 B1     9/2004   Yamaguchi et al.
2003/0156146 A1* 8/2003   Suomela ............... G06F 3/0481
                                                 715/864
(Continued)

FOREIGN PATENT DOCUMENTS

CN           1297178 A      5/2001
CN         101399858 A      4/2009
WO    WO 2010/021449 A1    2/2010

OTHER PUBLICATIONS

International Search Report and Written Opinion for Application No. PCT/CN2010/070914 dated Dec. 16, 2010.
(Continued)

*Primary Examiner* — Abdullah Al Kawsar
*Assistant Examiner* — Jamie Duckworth
(74) *Attorney, Agent, or Firm* — Alston & Bird LLP

(57) ABSTRACT

An apparatus, a method, a computer program and a graphical user interface is provided. The apparatus comprises at least one processor; and at least one memory storing computer program instructions, the at least one processor being configured to execute the computer program instructions to cause the apparatus at least to perform: controlling a display to display one or more graphical items from a first layer of a hierarchical menu system; in response to user selection of a first graphical item from the first layer of the hierarchical menu system, entering a second layer of the hierarchical menu system, wherein entering the second layer of the hierarchical menu system comprises displaying one or more further graphical items, from the second layer of the hierarchical menu system, associated with the first graphical item; detecting a change in inclination of the apparatus, while the one or more graphical items from the first layer of the hierarchical menu system are displayed on the display; and controlling, after detecting the change in inclination of the apparatus, the display to display a preview comprising
(Continued)

the one or more further graphical items, associated with the first graphical item, from the second layer of the hierarchical menu system.

7 Claims, 9 Drawing Sheets

(51) Int. Cl.
    *G06F 1/16*     (2006.01)
    *G06F 3/0482*     (2013.01)

(58) Field of Classification Search
    CPC ...... G06F 1/1626; G06Q 10/02; G06Q 10/20; G06Q 20/145; G06Q 30/012; G06Q 30/0265; G06Q 30/0633; G06Q 30/0639; G06Q 30/0645; G06Q 50/30; G06Q 50/01; G06Q 10/00; G11B 27/34
    USPC .................................................. 715/841
    See application file for complete search history.

(56) References Cited

U.S. PATENT DOCUMENTS

| | | | |
|---|---|---|---|
| 2004/0212617 A1* | 10/2004 | Fitzmaurice | G06F 3/0481 345/440 |
| 2006/0187204 A1 | 8/2006 | Yi et al. | |
| 2008/0022228 A1* | 1/2008 | Kwon | G06F 3/0482 715/838 |
| 2008/0109751 A1* | 5/2008 | Fitzmaurice et al. | 715/793 |
| 2008/0113688 A1 | 5/2008 | Lee et al. | |
| 2009/0058828 A1* | 3/2009 | Jiang et al. | 345/173 |
| 2009/0289907 A1 | 11/2009 | Ruscher et al. | |
| 2009/0307626 A1* | 12/2009 | Jalon | G06F 3/0481 715/771 |
| 2009/0307633 A1* | 12/2009 | Haughay et al. | 715/841 |
| 2010/0030469 A1* | 2/2010 | Hwang | G01C 21/36 701/533 |
| 2010/0033422 A1* | 2/2010 | Mucignat | G06F 1/1626 345/156 |
| 2010/0056220 A1* | 3/2010 | Oh | G06F 1/1616 455/566 |
| 2010/0060475 A1* | 3/2010 | Choi | G06F 1/1616 340/689 |
| 2010/0125816 A1* | 5/2010 | Bezos | G06F 1/1626 715/863 |
| 2010/0229094 A1* | 9/2010 | Nakajima et al. | 715/727 |
| 2011/0077903 A1* | 3/2011 | Lee | G06F 1/1626 702/151 |
| 2011/0083103 A1* | 4/2011 | Shim | G06F 3/0482 715/810 |
| 2011/0124376 A1* | 5/2011 | Kim | G06F 1/1626 455/566 |
| 2011/0145765 A1* | 6/2011 | Yu et al. | 715/835 |
| 2011/0161884 A1* | 6/2011 | Dugan | G06F 1/1626 715/843 |
| 2011/0216004 A1* | 9/2011 | Stephenson | G06F 3/033 345/163 |

OTHER PUBLICATIONS

Supplementary European Search Report from corresponding EP Appl. No. 10847190.5, dated Feb. 28, 2014.
Extended Search Report from corresponding European Application No. 13151110.7, dated Feb. 27, 2014.
Office Action for Vietnamese Application No. 1-2012-02860 dated Jun. 7, 2018, 2 pages.
Office Action for European Application No. 10 847 190.5 dated May 28, 2018.
Office Action for European Application No. 13 151 110.7 dated Jun. 26, 2018.

* cited by examiner

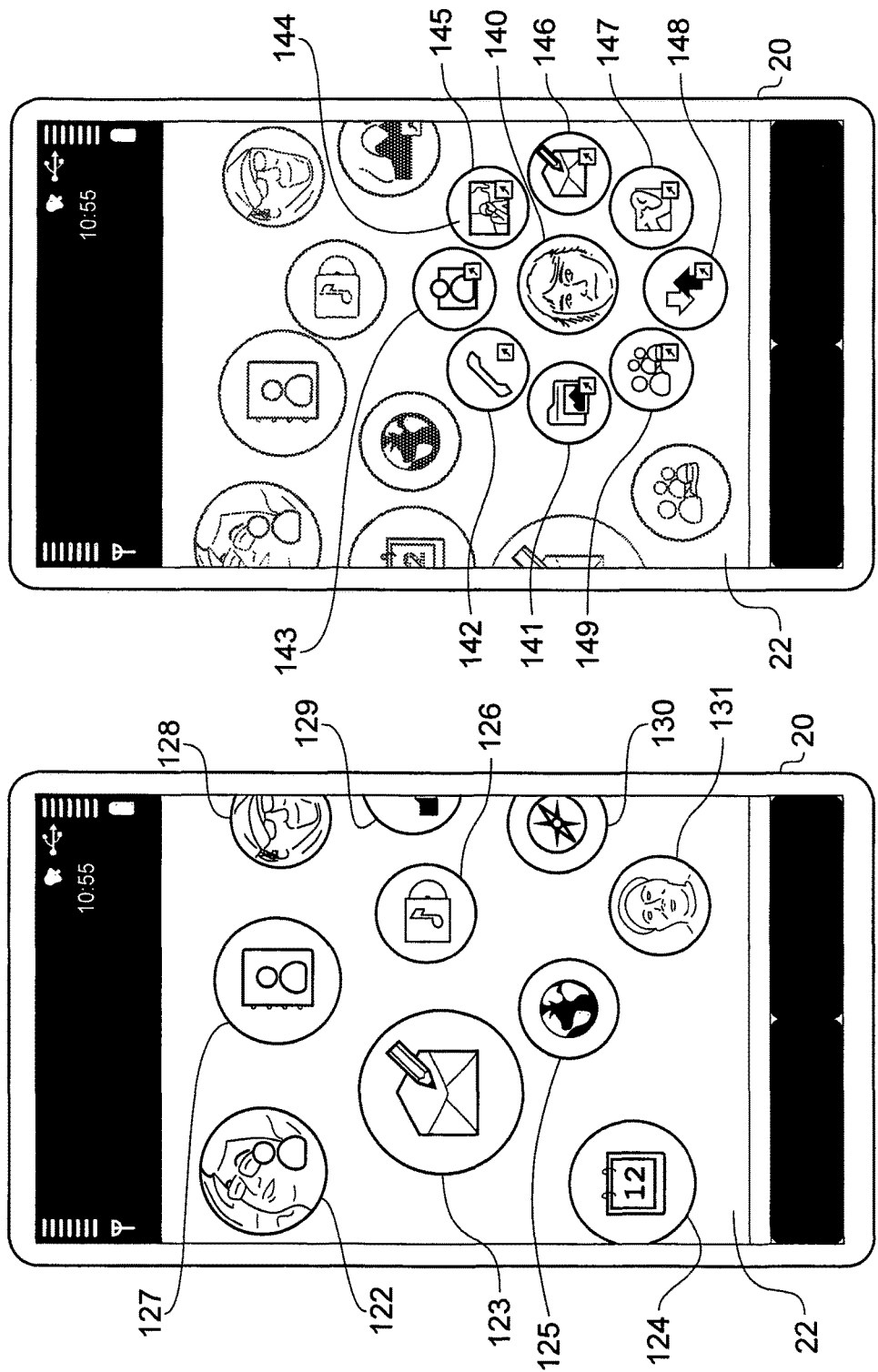

USER INTERFACE

FIELD OF THE INVENTION

Embodiments of the present invention relate to a user interface. In particular, they relate to a user interface having a preview function.

BACKGROUND TO THE INVENTION

An electronic device (such as a mobile telephone, for example) may provide a graphical user interface having a hierarchical menu system. The hierarchical menu system may comprise a number of different 'layers'. Each graphical item in a first layer of the hierarchical menu has one or more associated graphical items in the second layer of the hierarchical menu system.

Consider an example in which an electronic device presents a first set of graphical items from the first layer of a hierarchical menu system. The user may enter the second layer by selecting a first graphical item (for example, relating to "messaging") from the presented first set of graphical items. Selection of the first graphical item results in a second set of graphical items (for instance, relating to an "inbox", "sent items" and "message creation"), from the second layer of the hierarchical menu system, being presented to the user. Each of graphical items from the second set is associated with the selected first graphical item.

If the user does not find the graphical item he is searching for (for example, "message settings") within the presented second set of graphical items, he may have to return to the first layer of the menu system and then enter a different section of the second layer of the menu system to find the desired graphical item. For example, he may be required to return to the first layer of menu system and select an alternative graphical item from the first layer (for instance, "general settings"), in order for the electronic device to present him with the desired graphical item from the second layer of the menu system (for example, "message settings").

This process can be frustrating for a user.

BRIEF DESCRIPTION OF VARIOUS EMBODIMENTS OF THE INVENTION

According to some, but not necessarily all, embodiments of the invention, there is provided an apparatus, comprising: at least one processor; and at least one memory storing computer program instructions, the at least one processor being configured to execute the computer program instructions to cause the apparatus at least to perform: controlling a display to display one or more graphical items from a first layer of a hierarchical menu system; in response to user selection of a first graphical item from the first layer of the hierarchical menu system, entering a second layer of the hierarchical menu system, wherein entering the second layer of the hierarchical menu system comprises displaying one or more further graphical items, from the second layer of the hierarchical menu system, associated with the first graphical item; detecting a change in inclination of the apparatus, while the one or more graphical items from the first layer of the hierarchical menu system are displayed on the display; and controlling, after detecting the change in inclination of the apparatus, the display to display a preview comprising the one or more further graphical items, associated with the first graphical item, from the second layer of the hierarchical menu system.

According to some, but not necessarily all, embodiments of the invention, there is provided a method, comprising: controlling a display to display one or more graphical items from a first layer of a hierarchical menu system; in response to user selection of a first graphical item from the first layer of the hierarchical menu system, entering a second layer of the hierarchical menu system, wherein entering the second layer of the hierarchical menu system comprises displaying one or more further graphical items, from the second layer of the hierarchical menu system, associated with the first graphical item; detecting a change in inclination, while the one or more graphical items from the first layer of the hierarchical menu system are displayed on the display; and controlling, after detecting the change in inclination, the display to display a preview comprising the one or more further graphical items, associated with the first graphical item, from the second layer of the hierarchical menu system.

According to some, but not necessarily all, embodiments of the invention, there is provided a computer program comprising computer program instructions that, when executed by at least one processor, cause an apparatus to perform at least the following: controlling a display to display one or more graphical items from a first layer of a hierarchical menu system; in response to user selection of a first graphical item from the first layer of the hierarchical menu system, entering a second layer of the hierarchical menu system, wherein entering the second layer of the hierarchical menu system comprises displaying one or more further graphical items, from the second layer of the hierarchical menu system, associated with the first graphical item; detecting a change in inclination, while the one or more graphical items from the first layer of the hierarchical menu system are displayed on the display; and controlling, after detecting the change in inclination, the display to display a preview comprising the one or more further graphical items, associated with the first graphical item, from the second layer of the hierarchical menu system.

According to some, but not necessarily all, embodiments of the invention, there is provided an apparatus, comprising: means for controlling a display to display one or more graphical items from a first layer of a hierarchical menu system; means for entering a second layer of the hierarchical menu system, in response to user selection of a first graphical item from the first layer of the hierarchical menu system, wherein entering the second layer of the hierarchical menu system comprises displaying one or more further graphical items, from the second layer of the hierarchical menu system, associated with the first graphical item; means for detecting a change in inclination, while the one or more graphical items from the first layer of the hierarchical menu system are displayed on the display; and means for controlling, after detecting the change in inclination, the display to display a preview comprising the one or more further graphical items, associated with the first graphical item, from the second layer of the hierarchical menu system.

According to some, but not necessarily all, embodiments of the invention, there is provided a graphical user interface, comprising: one or more graphical items from a first layer of a hierarchical menu system, wherein user selection of a first graphical item from the first layer of the hierarchical menu system causes a second layer of the hierarchical menu system to be entered; one or more further graphical items, from the second layer of the hierarchical menu system and associated with the first graphical item, displayed in response to user selection of the first graphical item causing the second layer of the hierarchical menu system to be entered; and a preview mode in which the one or more further graphical items, from the second layer of the hierarchical menu system and associated with the first graphical item, are displayed after detection of a change in inclination while the one or more graphical items from the first layer of the hierarchical menu system are displayed.

According to some, but not necessarily all, embodiments of the invention, there is provided an apparatus, comprising: at least one processor; and at least one memory storing computer program instructions, the at least one processor being configured to execute the computer program instructions to cause the apparatus at least to perform: storing a data structure associating a first graphical item with one or more items; controlling a display to display the first graphical item; detecting a change in inclination of the apparatus while the first graphical item is displayed on the display; and controlling, after detecting the change in inclination of the apparatus, the display to display an indication of the items, associated with the first graphical item, in visual association with the first graphical item.

According to some, but not necessarily all, embodiments of the invention, there is provided a method, comprising: storing a data structure associating a first graphical item with one or more items; controlling a display to display the first graphical item; detecting a change in inclination while the first graphical item is displayed on the display; and controlling, after detecting the change in inclination of the apparatus, the display to display an indication of the items, associated with the first graphical item, in visual association with the first graphical item.

According to some, but not necessarily all, embodiments of the invention, there is provided a computer program comprising computer program instructions that, when executed by at least one processor, cause an apparatus to perform at least the following: storing a data structure associating a first graphical item with one or more items; controlling a display to display the first graphical item; detecting a change in inclination while the first graphical item is displayed on the display; and controlling, after detecting the change in inclination of the apparatus, the display to display an indication of the items, associated with the first graphical item, in visual association with the first graphical item.

BRIEF DESCRIPTION OF THE DRAWINGS

For a better understanding of various examples of embodiments of the present invention reference will now be made by way of example only to the accompanying drawings in which:

FIG. 9A illustrates an apparatus displaying graphical menu items; and

FIG. 9B illustrates an apparatus displaying further graphical menu items in visual association with an identified graphical item.

DETAILED DESCRIPTION OF VARIOUS EMBODIMENTS OF THE INVENTION

Figure 1:
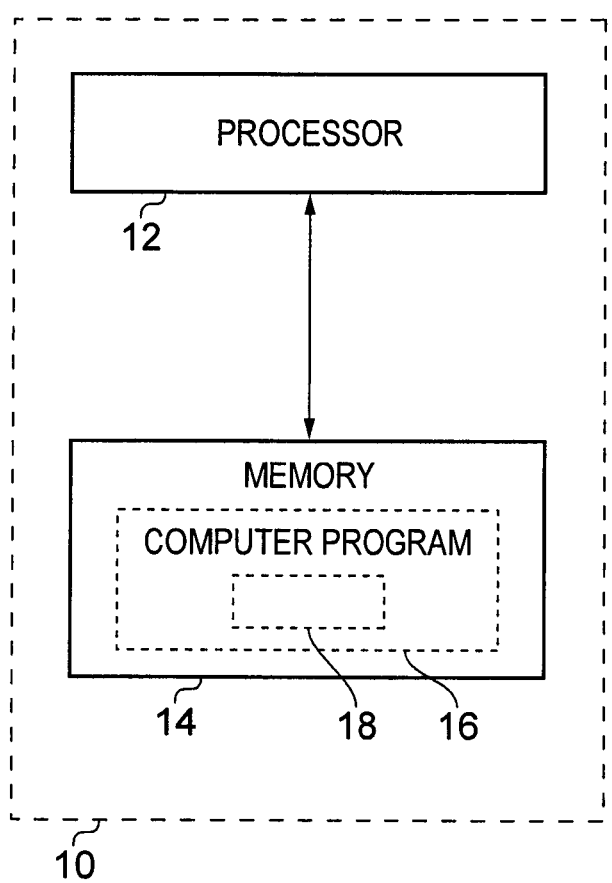
FIG. 1 illustrates an apparatus.

The Figures illustrate an apparatus 10/20, comprising: at least one processor 12; and at least one memory 14 storing computer program instructions 18, the at least one processor 12 being configured to execute the computer program instructions 18 to cause the apparatus 10/20 at least to perform: controlling a display 22/23 to display one or more graphical items 50, 60, 70 from a first layer 100 of a hierarchical menu system 300; in response to user selection of a first graphical item 50 from the first layer 100 of the hierarchical menu system 300, entering a second layer 200 of the hierarchical menu system 300, wherein entering the second layer 200 of the hierarchical menu system 300 comprises displaying one or more further graphical items 52, 54, 56, from the second layer 200 of the hierarchical menu system 300, associated with the first graphical item 50; detecting a change in inclination of the apparatus 10/20, while the one or more graphical items 50, 60, 70 from the first layer 100 of the hierarchical menu system 300 are displayed on the display 22/23; and controlling, after detecting the change in inclination of the apparatus 10/20, the display 22/23 to display a preview 80 comprising the one or more further graphical items 52, 54, 56, associated with the first graphical item 50, from the second layer 200 of the hierarchical menu system 300.

FIG. 1 illustrates an apparatus 10. The apparatus may, for example, be a chip or a chip-set. The apparatus 10 illustrated in FIG. 1 comprises a processor 12 and a memory 14. In alternative embodiments of the invention, the apparatus 10 may comprise multiple processors.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components, some or all of which may be integrated/removable and/or may provide permanent/semi-permanent/dynamic/cached storage.

The memory 14 stores a computer program 16 comprising computer program instructions 18 that control the operation of the apparatus 10/20 when loaded into the processor 12. The computer program instructions 18 provide the logic and routines that enables the apparatus 10/20 to perform the method illustrated in FIG. 7. The processor 12 by reading the memory 14 is able to load and execute the computer program instructions 18.

The computer program 16 may arrive at the apparatus 10/20 via any suitable delivery mechanism 40. The delivery mechanism 40 may be, for example, a tangible computer-readable storage medium, a computer program product, a memory device, a record medium such as a CD-ROM, DVD or Blu-Ray disc, or any article of manufacture that tangibly embodies the computer program 16. The delivery mechanism 40 may be a signal configured to reliably transfer the computer program 16.

Figure 2:
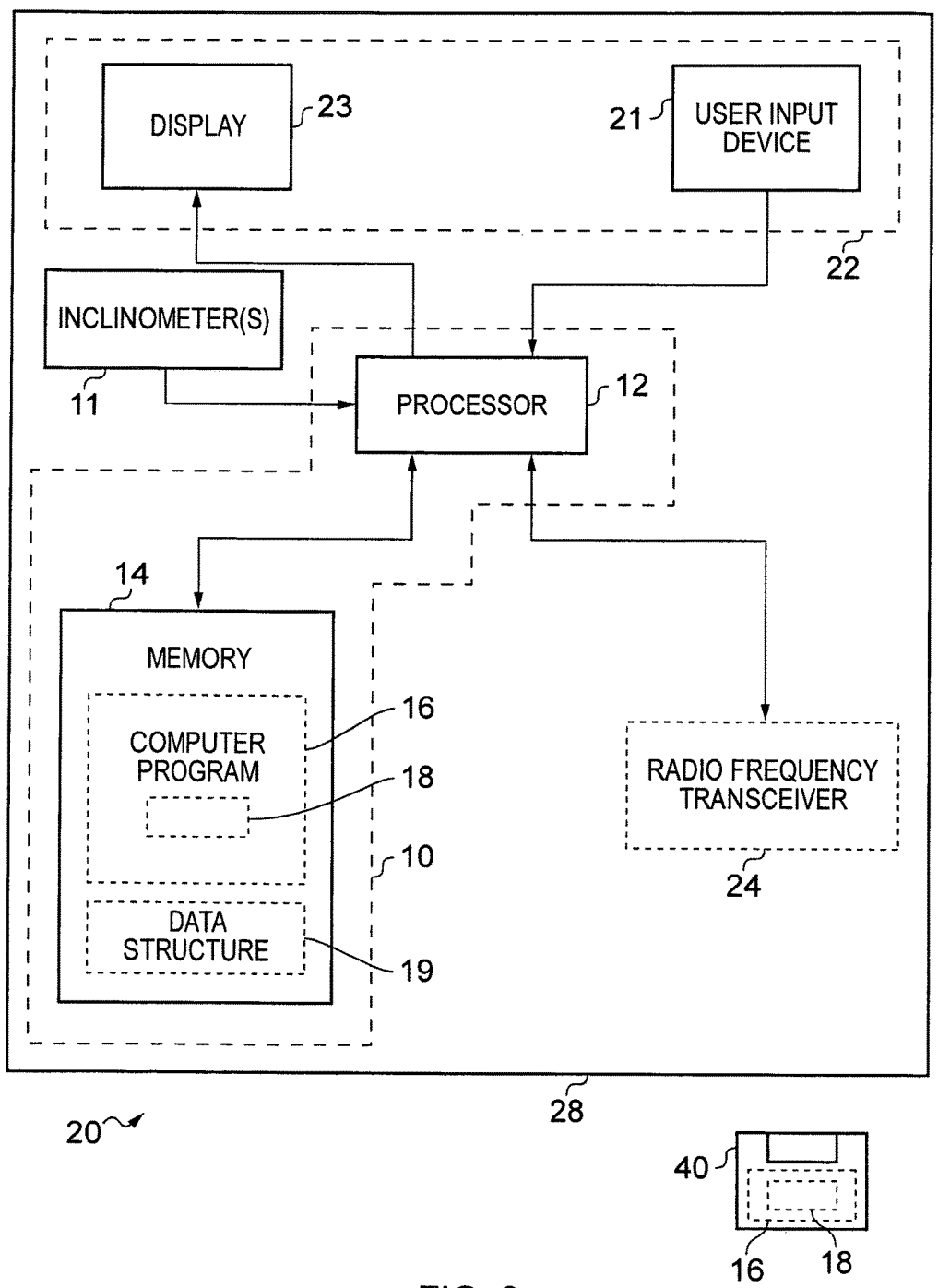
FIG. 2 illustrates a further apparatus.

FIG. 2 illustrates a further apparatus 20. The apparatus 20 illustrated in FIG. 2 may, for example, be a hand portable electronic device such as a mobile telephone, a personal music player, a personal digital assistant, a tablet computer, a games console or a camera.

The apparatus 20 illustrated in FIG. 2 comprises the apparatus 10 illustrated in FIG. 1. The apparatus 20 further comprises a housing 28, a user input device 21, a display 23, one or more inclinometers 11 and optionally, a radio frequency transceiver 24. The housing 28 houses: the processor 12, the memory 14, the user input device 21, the display 23, the one or more inclinometers 11 and the radio frequency transceiver 24. The elements 11, 12, 14, 21, 23, and 24 are co-located within the housing 28. The elements 11, 12, 14, 21, 23 and 24 are operationally coupled and any number or combination of intervening elements can exist (including no intervening elements).

The processor 12 is configured to provide outputs to the display 23 and the radio frequency transceiver 24. The processor 12 is configured to receive inputs from the user input device 21, the one or more inclinometer(s) 11 and the radio frequency transceiver 24.

The memory 14 is illustrated in FIG. 2 as storing a computer program 16 and a data structure 19. The stored data structure 19 may comprise a hierarchical menu system. The data structure 19 may associate graphical items of the hierarchical menu system with one or more other graphical items.

The display 23 is configured to provide a graphical user interface. In some embodiments of the invention, the display 23 and the user input device 21 are separate. The user input device 21 may, for example, comprise a keypad. The keypad may include one or more selection keys, one or more navigation keys and/or a plurality of alphanumeric keys.

In some embodiments of the invention, the apparatus 20 may comprise a touch sensitive display 22 in which the display 23 and the user input device 21 are integrated. The touch sensitive display 22 may be any type of touch sensitive display.

For example, the touch sensitive display 22 may incorporate resistive sensing technology, capacitive sensing technology or some combination of the two.

The radio frequency transceiver 24 is configured to transmit and receive radio frequency signals. The radio frequency transceiver 24 may, for example, be a cellular transceiver that is compatible with one or more cellular protocols such as GSM (Global System for Mobile Communications), IS-95 (Interim Standard 95) or UMTS (Universal Mobile Telecommunications System). Alternatively, the radio frequency transceiver 24 may be a short range transceiver that is compatible with one or more short range protocols, such as Bluetooth protocols or IEEE (Institute of Electrical and Electronic Engineers) protocols. In some embodiments of the invention, the apparatus 20 comprises one or more cellular transceivers and one or more short range transceivers.

Figure 3:
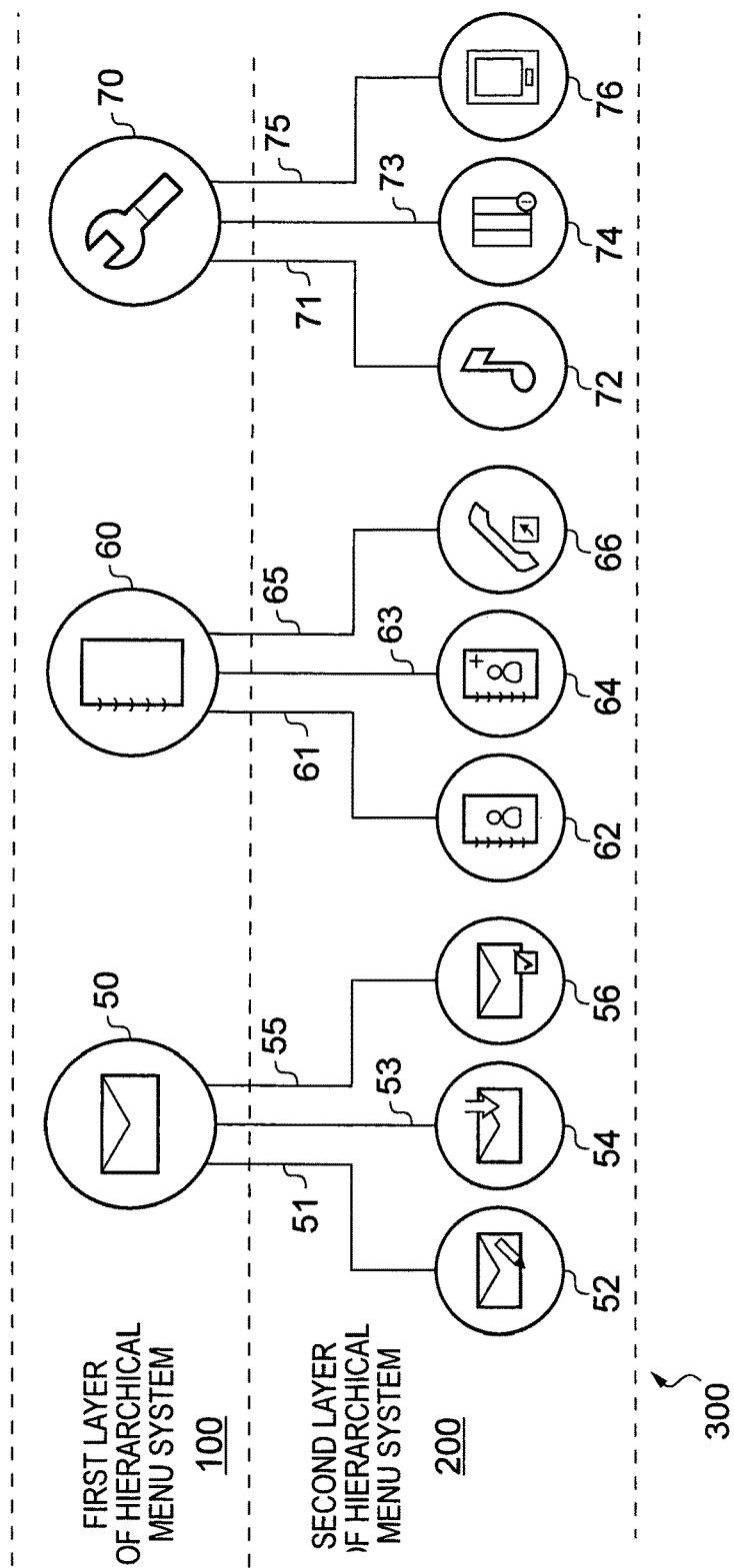
FIG. 3 illustrates a schematic of a hierarchical menu system.

In embodiments of the invention, the processor 12 is configured to control the display 23 to provide a hierarchical menu system. An exemplary hierarchical menu system 300 is illustrated in FIG. 3. The hierarchical menu system 300 is stored as a data structure 19 in the memory 14.

A hierarchical menu system has multiple 'layers'. The hierarchical menu system 300 illustrated in FIG. 3 comprises two layers 100, 200.

Each layer 100, 200 comprises one or more graphical items. A 'parent' graphical item in a particular layer may be associated with one or more 'child' graphical items in the layer below.

In the example illustrated in FIG. 3, the first layer 100 comprises first, second and third graphical items 50, 60, 70.

In this example, the first graphical item 50 relates to "messaging", second graphical item 60 relates to "contacts" and the third graphical item 70 relates to "settings". The subject that a particular graphical item relates to may be apparent from its graphical appearance, as is the case in the FIG. 3 example.

In this example, the first layer 100 is the 'uppermost' layer of the hierarchical menu system 300. That is, the first layer 100 is initially presented to the user when the hierarchical menu system 300 is entered (for example, from an idle screen of the apparatus 20). Each of the graphical elements 50, 60, 70 in the first layer 100 does not, therefore, have an associated parent graphical item.

The first graphical item 50 from the first layer 100 is associated with one or more child graphical items 52, 54, 56 from the second layer 200 by the data structure 19. This is indicated by the lines 51, 53, 55 in FIG. 3. The first graphical item 50 from the first layer 100 is the parent graphical item for three child graphical items 52, 54, 56. Consequently, user selection of the first graphical item 50 results in each of the child graphical items 52, 54, 56 being presented on the display 23. In this example, a first associated child graphical item 52 relates to "message creation", a second associated child graphical item 54 relates to an "inbox", and a third associated child graphical item 56 relates to "sent items".

The second graphical item 60 from the first layer 100 is associated with one or more child graphical items 62, 64, 66 from the second layer 200 by the data structure 19. This is indicated by the lines 61, 63, 65 in FIG. 3. The second graphical item 60 from the first layer 100 is the parent graphical item for the child graphical items 62, 64, 66. Consequently, user selection of the second graphical item 60 results in each of the associated child graphical items 62, 64, 66 being presented on the display 23. In this example, a first associated child graphical item 62 relates to a "contacts list", a second associated child graphical item 64 relates to making an addition to the contacts list, and a third associated child graphical item 66 relates to "speed dials".

The third graphical item 70 from the first layer 100 is associated with one or more child graphical items 72, 74, 76 from the second layer 200 by the data structure 19. This is indicated by the lines 71, 73, 75 in FIG. 3. The third graphical item 60 from the first layer 100 is the parent graphical item for the child graphical items 72, 74, 76. Consequently, user selection of the third graphical item 70 results in each of the associated child graphical items 72, 74, 76 being presented on the display 23. In this example, a first associated child graphical item 72 relates to a "tones", a second associated child graphical item 74 relates to "display settings", and a third associated child graphical item 76 relates to "telephone settings".

In this particular example, when a parent graphical item is selected, only the child graphical items that are associated with the selected parent graphical item are presented on the display 23. For instance, the first graphical item 50 from the first layer 100 is associated with child graphical items 52, 54 and 56 but not child graphical items 62, 64, 66, 72, 74 and 76. User selection of the first graphical item 50 results in child graphical items 52, 54, 56 being presented on the display 23 but not child graphical items 62, 64, 66, 72, 74 and 76. Thus, the second layer 200 of the hierarchical menu system 300 can be thought of as being separated into different, isolated, 'sections', in which each section is associated with a different parent graphical item. The child graphical items 52, 54 and 56 can be considered to be in a first section of the second layer 200. The child graphical items 62, 64 and 66 can be considered to be in a second section of the second layer 200. The child graphical items 62, 64 and 66 can be considered to be in a third section of the second layer 200.

In some embodiments of the invention, a 'back' option may be provided. User selection of the 'back' option while any of the sections of the second layer 200 are being displayed on the display 23 results in the first layer 100 of the menu system 300 being re-entered and displayed on the display 23.

In some embodiments of the invention, the hierarchical menu system 300 may comprise more than two layers. In these embodiments of the invention, the graphical items 52, 54, 56, 62, 64, 66, 72, 74, 76 from the second layer 200 of the hierarchical menu system 300 may also act as parent graphical items for graphical items in a third layer of the hierarchical menu system 300.

Exemplary embodiments of the invention will now be described in relation to FIGS. 4A to 7. In these exemplary embodiments, the display 23 and the user input device 21 are integrated in a touch sensitive display 22.

Figure 4A:
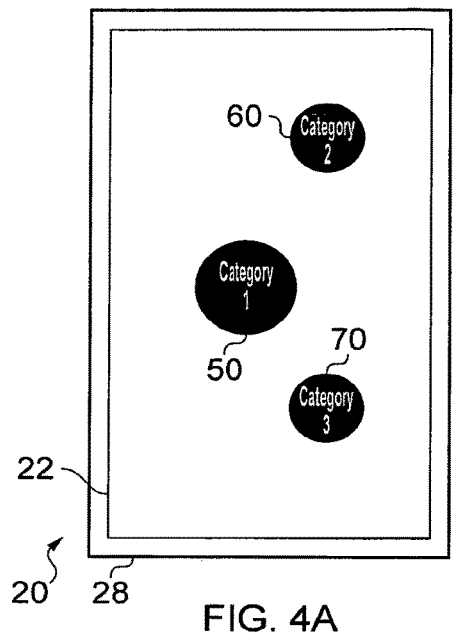
FIGS. 4A to 4D illustrate entry into a second layer of a hierarchical menu system.

FIG. 4A illustrates the processor 12 controlling the touch sensitive display 22 to display one or more graphical items 50, 60, 70 from a first layer 100 of a hierarchical menu system 300. While FIG. 4A illustrates three graphical items 50, 60, 70 being displayed, it will be appreciated by those skilled in the art that more or less graphical items may be displayed, depending upon the implementation.

In some implementations of the invention, each of the graphical items 50, 60, 70 illustrated in FIG. 4A have the same graphical appearance as those illustrated with corresponding reference numerals in FIG. 3. In other implementations, some or all of their graphical appearances may be different to that illustrated in FIG. 3.

The graphical items 50, 60, 70 are individually selectable by a user. That is, the first graphical item 50 is selectable without selecting the second graphical item 60 or the third graphical item 70. The second graphical item 60 is selectable without selecting the first graphical item 50 or the third graphical item 70. The third graphical item 70 is selectable without selecting the first graphical item 50 or the second graphical item 60.

The processor 12 is configured to detect user input at the touch sensitive display 22. In this particular example, the processor 12 is configured to determine that a graphical item has been selected by a user if the user touches that graphical item for longer than a threshold period of time (a 'long touch').

Figure 4B:
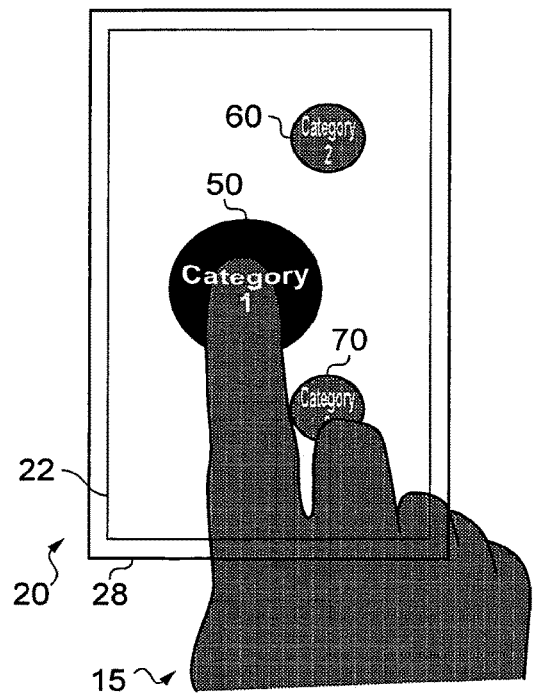

FIG. 4B illustrates a user 15 selecting the first graphical item 50 from the first layer 100 of the hierarchical menu system 300 by touching the touch sensitive display 22, at the first graphical item 50, for longer than a threshold period of time.

The processor 12 responds to user selection of the first graphical item 50 by entering a second layer 200 of the hierarchical menu system 300. Entering the second layer 200 of the hierarchical menu system 300 comprises displaying one or more further graphical items 52, 54, 56, from the second layer 200 of the hierarchical menu system 300, associated with the selected graphical item 50.

In this example, the processor 12 performs entry into the second layer 200 of the menu system 300 by controlling the display 22 to show the first graphical item 50 breaking (for example, shattering) and then subsequently controlling the display 22 to display the child graphical items 52, 54, 56 (from the second layer 200 of the menu system 300) that are associated with the selected graphical item 50.

Figure 4C:
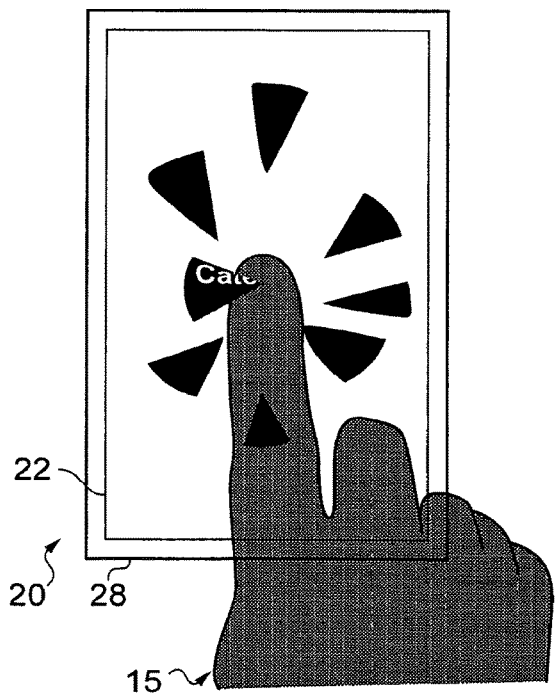
Figure 4D:
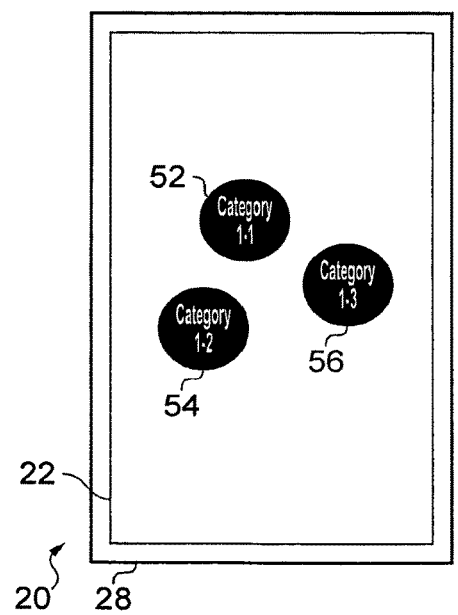

FIG. 4C illustrates the first graphical item 50 breaking and FIG. 4D illustrates the child graphical items 52, 54, 56 being displayed on the display 22. Each of the child graphical items 52, 54, 56 is individually selectable by the user 15. The child graphical items 52, 54, 56 may have the same graphical appearance as those illustrated in FIG. 3 with corresponding reference numerals, or a different graphical appearance.

FIG. 4D illustrates three child graphical items 52, 54, 56, from the second layer 200 of the menu system 300, that are associated with the selected graphical item 50. In other examples, there may be more or fewer associated child graphical items.

In this particular implementation of the invention, the processor 12 removes each of the graphical items 50, 60, 70 from the first layer 100 of the menu system 300 from display when the second layer 200 is entered (and the child graphical items 52, 54, 56 are displayed). That is, the selected first, second and third graphical items 50 from the first layer 100 are not displayed concurrently with the child graphical items 52, 54, 56 associated with the selected first graphical item 50.

In alternative implementations of the invention, the selected first graphical item 50 may not be removed from display when it is selected and the second menu layer 200 is entered. The first graphical item 50 from the first layer 100 may be displayed concurrently with its associated child graphical items 50, 60, 70. In these implementations, the processor 12 may respond to selection of the first graphical item 50 by changing the graphical appearance of the first graphical item to indicate that it has been selected. The graphical items 60, 70 from the first layer 100 that have not been selected by the user may or may not be removed from display when the second layer 200 is entered.

The user 15 may return to the first layer 100 of the menu system 300 by selecting a 'back' option. The back option may be provided as an individually selectable graphical option on the display 22. Alternatively, the back option may be provided by a key, separate from the display 22.

When the back option is selected by the user 15, the processor 12 responds by re-entering the first layer 100 of the menu system 300. Upon re-entry into the first layer 100 of the menu system 300, the graphical items 50, 60, 70 from the first layer 100 are displayed on the display 22.

Figure 5B:
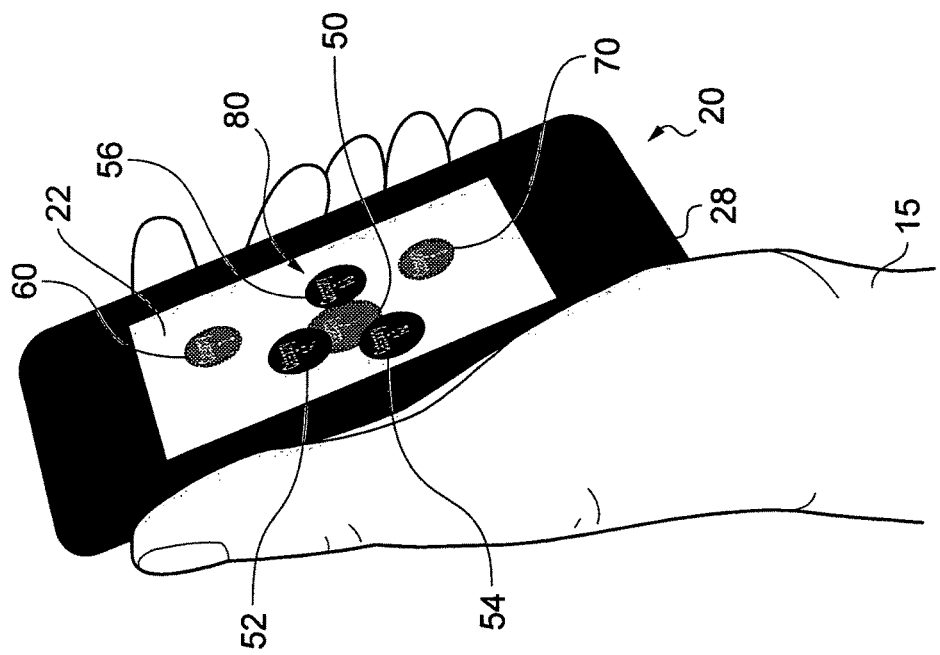
FIGS. 5A, 5B and 6 illustrate previewing the second layer of the hierarchical menu system.
Figure 5A:
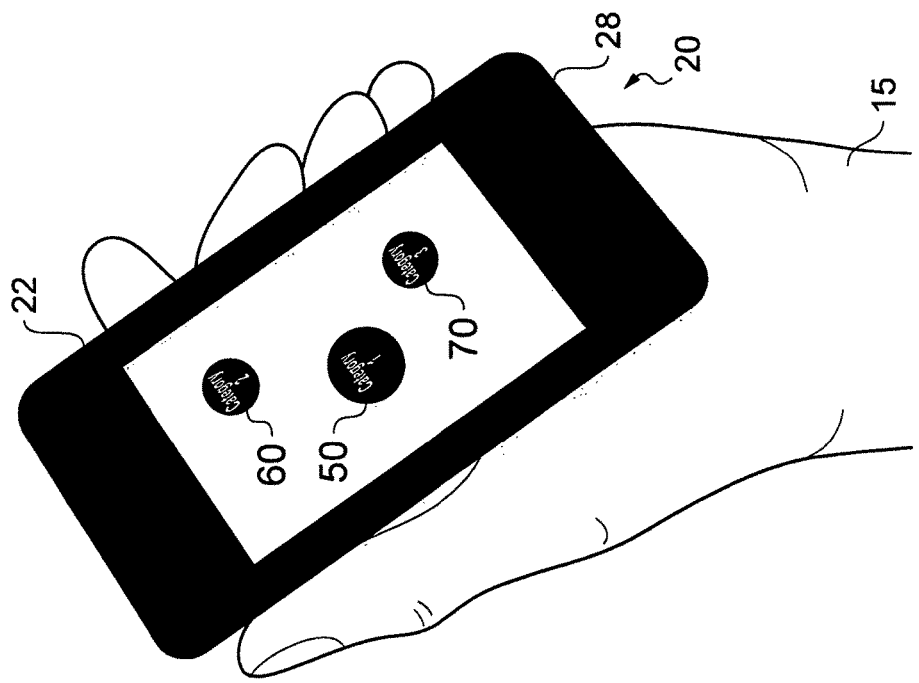

FIG. 5A illustrates the user 15 holding the apparatus 20 in the palm of his hand. In FIG. 5A, the processor 12 is controlling the display 22 to display the graphical items 50, 60, 70 from the first layer of the menu system 300.

As explained above, a user 15 may select one of the graphical items 50, 60, 70 by providing touch input at a graphical item, causing the processor 12 to respond by entering the second layer 200 of the menu system 300. In this example, a graphical item is selected by providing touch input for longer than a threshold period of time.

Alternatively, the user 15 may identify one of the graphical items 50, 60, 70 for preview. A user identifies a graphical item for preview by providing a different form of user input to that provided when selecting a graphical item. In this example, the user identifies a graphical item for preview by touching the touch sensitive display 22, at that graphical item, for less than the threshold period of time (a 'short touch'). If the user subsequently tilts the apparatus 20, changing its inclination, the processor 12 causes the apparatus 20 to enter a 'preview mode'.

The processor 12 detects the change in inclination of the apparatus 20 using one or more inputs provided by the one or more inclinometers 11. The processor 12 may be configured to cause the apparatus 20 to enter the preview mode after detecting that the change in the inclination of the apparatus 20 exceeds a threshold value.

Figure 6:
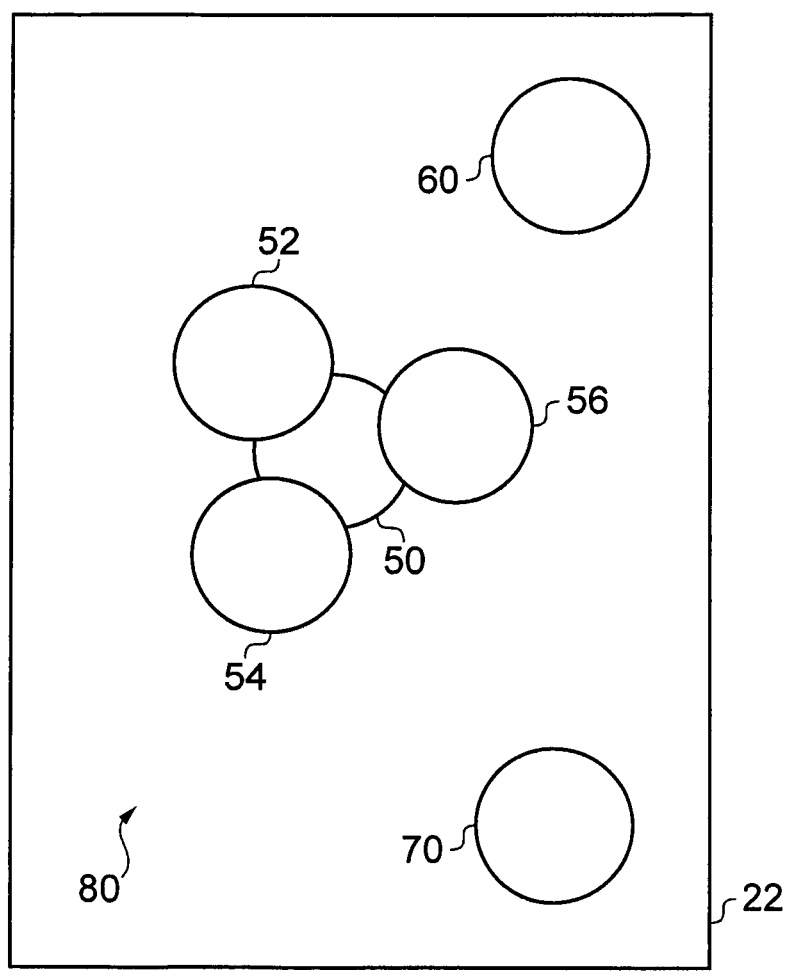

FIG. 5B illustrates the apparatus 20 in preview mode after it has been tilted by the user 15. FIG. 6 is a two dimensional illustration of the display 22 of the apparatus 20 in FIG. 5B. No text or images are shown in the graphical items 50, 52, 54, 56, 60 and 70 in FIG. 6 for clarity purposes.

When the processor 12 causes the apparatus 20 to enter the preview mode, it controls the display 22 to display a preview 80. The displayed preview 80 may comprise the child graphical items 52, 54, 56, from the second layer 200 of the menu system 300, which are associated with the graphical item 50 identified for preview by the user 15.

In this example, when the processor 12 causes the apparatus to enter preview mode, it controls the display 22 to display some or all of the child graphical items 52, 54, 56 that would be presented on the display 22, if the user 15 were to select the first graphical item 50 to enter the second layer 200 of the menu system 300.

The preview 80 therefore advantageously enables a user 15 to see which child graphical items would be presented on the display 22 if the next layer of the menu system 300 were entered. If a user 15 is looking to cause the apparatus 20 to perform a particular function, he can use the preview mode to see whether selection of a particular graphical item will enable him to reach a point in the menu system 300 that enables that function to be performed. This means that, potentially, time is saved because a user is less likely to have to keep moving back and forth between menu layers to find what he is looking for.

In the example illustrated in FIGS. 5B and 6, the processor 12 controls the display 22 to maintain the first, second and third graphical items 50, 60, 70 (from the first layer 100 of the menu system 300) on the display 22 when the preview mode is entered. The processor 12 may, for example, control the display 22 to change the graphical appearance of the first, second and third graphical items 50, 60, 70 when the preview mode is entered. For example, the first, second and third graphical items 50, 60, 70 may be presented in grayscale while the child graphical items 52, 54, 56 are presented in color. This enables the user to distinguish between the graphical items 52, 54, 56 from the second layer 200 (being presented as a preview 80) and the graphical items 50, 60, 70 from the first layer 100.

In the example illustrated in FIGS. 5B and 6, the child graphical items 52, 54, 56 that form at least part of the preview 80 are displayed in visual association with the first graphical item 50. That is, the visual appearance of preview 80 is such that the user can identify that the child graphical items 52, 54, 56 are associated with the first graphical item 50. For example, the child graphical items 52, 54, 56 may be displayed adjacent to the first graphical item 50. In the illustrated example, the displayed child graphical items 52, 54, 56 are distributed around a perimeter of the first graphical item. A portion of each child graphical item 52, 54, 56 overlaps a different portion of the first graphical item 50.

Advantageously, since the child graphical items 52, 54, and 56 are displayed in visual association with the first graphical item 50, the user intuitively associates the child graphical items 52, 54, 56 with the first graphical item 50.

The preview 80 may be a non-interactive preview. If the preview 80 is non-interactive, the child graphical items 52, 54, 56 presented in the preview 80 are non-selectable by the user. The processor 12 does not respond to user input at a particular child graphical item 52, 54, 56 by performing the action that is performed when that child graphical item 52, 54, 56 is selected after entry into the second layer 200 of the menu system 300.

For instance, consider an example in which the child graphical item 52 relates to accessing an inbox, as illustrated in FIG. 3. Selection of the child graphical item 52 causes the processor 12 to respond by controlling the display 22 to display the contents of user's inbox. However, when the child graphical item 52 is displayed as part of a non-interactive preview 80, the processor 12 does not respond to user input at the child graphical item 52.

Alternatively, the preview 80 may be an interactive preview. If the preview 80 is interactive, the processor 12 is configured to respond to selection of a child graphical item 52, 54, 56 when the apparatus 20 is in preview mode. However, it may be that selection of the child graphical item 52 causes the processor 12 to respond by performing a different action to that which would be performed when selecting that child graphical item 52, 54, 56 after entry into the second layer 200 of the menu system 300.

For instance, selection of the graphical item 52 when the apparatus 20 is in preview mode may cause the processor 12 to respond by controlling the display 22 to display text explaining the function of the inbox without causing the contents of the inbox to be displayed. For example, the processor 12 may control the display 22 to display the message "Contains received messages".

In some implementations of the invention, the preview 80 that is displayed in visual association with a graphical item may depend upon the direction in which the apparatus 20 is inclined. For instance, consider an exemplary hierarchical menu system having three different layers. In a situation where graphical items from the second layer of the hierarchical menu are being displayed, it may be possible to preview both the first layer and the third layer.

For example, after a user has identified a graphical item from the second layer for preview, the processor 12 may respond to a change in inclination of the apparatus 20 in a first direction by controlling the display 22 to display a preview comprising graphical items from the first layer. In this instance, the preview illustrates which graphical items would be displayed if the user selected a 'back' option in the menu system 300. The processor 12 may respond to a change in inclination of the apparatus 20 in a second direction by controlling the display 22 to display a preview comprising graphical items from the third layer. In this instance, the preview illustrates which graphical items would be displayed if the user were to select the graphical item from the second layer that has been identified for preview.

In some alternative embodiments of the invention to those described above in relation to FIGS. 5A to 6, it may not be necessary for the user to identify a graphical item for preview by touching the display 22. For example, in these alternative embodiments, the processor 12 may control the display 22 to display associated child graphical items for some or all of the displayed graphical elements 50, 60, 70 in response to detecting a change in the inclination of the apparatus 20.

Figure 7:
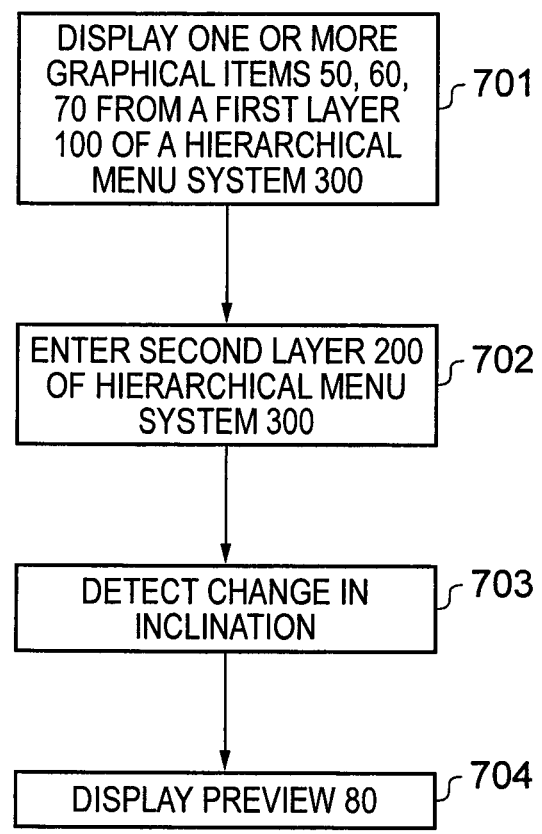
FIG. 7 illustrates a flow chart of a method.

FIG. 7 illustrates a method according to embodiments of the invention. At block 701 of FIG. 7, the processor 12 controls the display to display one or more graphical items 50, 60, 70 from a first layer 100 of a hierarchical menu system 300, as illustrated in FIG. 4A.

At block 702 of FIG. 7, a user 15 selects a first graphical item 50, as illustrated in FIG. 4B. In response, the processor 12 enters a second layer 200 of the hierarchical menu system 300. Entering the second layer 200 of the hierarchical menu system 300 comprises displaying one or more further graphical items 52, 54, 56 from the second layer 200, as illustrated in FIG. 4D. The one or more further graphical items 52, 54, 56 are associated with the selected first graphical item 50.

The user 15 may cause the apparatus 20 to re-enter the first layer 100 of the hierarchical menu system 300 using a 'back' option, as described above. When the apparatus 20 re-enters the first layer 100 of the menu system 300, the one or more graphical items 50, 60, 70 from the first layer 100 of the menu system 300 are re-displayed. At block 703 of FIG. 7, while one or more graphical items 50, 60, 70 are displayed on the display 22, the processor 12 detects a change in inclination of the apparatus 20 using one or more inputs received from the inclinometer(s) 11.

After detecting the change in the inclination of the apparatus 20, at block 704 of FIG. 7, the processor 12 controls the display 22 to display a preview 80, as illustrated in FIGS. 5B and 6. The preview 80 comprises the one or more further graphical items 52, 54, 56 that are from the second layer 200 of the menu system 300 and associated with the first graphical item 50.

Figure 8A:
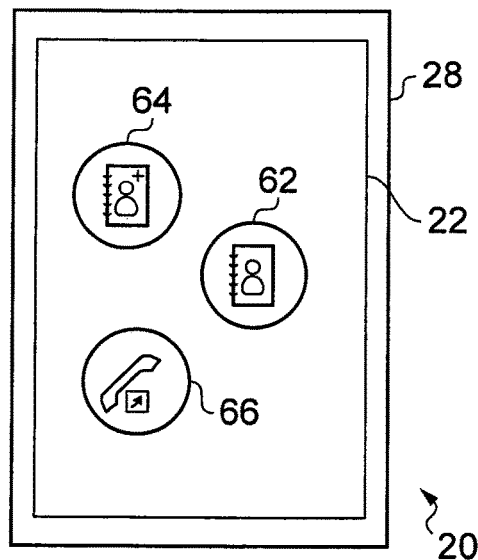
FIG. 8A illustrates an apparatus displaying multiple graphical menu items.

Some further embodiments of the invention will now be described in relation to FIGS. 8A, 8B and 8C. FIG. 8A illustrates the processor 12 controlling the display 22 to display a plurality of graphical items 62, 64, 66 from the second layer 200 of the hierarchical menu system 300 (see FIG. 3), following user selection of the 'contacts' graphical item 60 from the first layer 100 of the menu system 300.

In the FIG. 8A example, three graphical items are displayed: a first graphical item 62, relating to a "contacts list", a second graphical item 64 relating to making an addition to the contacts list, and a third graphical item relating to "speed dials".

In this example, the contacts list graphical item 62 is associated, via the data structure 19, with a plurality of stored contact data items. Each contact data item relates to a contact (for example, a person). A contact data item may, for instance, include data fields identifying the name, telephone number and email address of a contact, and a link to an image of the contact (such as a photograph).

The contacts list graphical item 62 is also associated, via the data structure 19, with a plurality of graphical items 91-96 from a third layer of the menu system 300. The contacts list graphical item 62 acts as a parent graphical item for the plurality of associated graphical items 91-96 from the third layer.

A user may select the contacts list graphical item 62 by touching the display 22, at the contacts list graphical item 62, for more than a threshold period of time. The processor 12 responds to user selection of the contacts list graphical item by entering the third layer of the menu system 300. When entering the third layer, the processor 12 removes the second layer graphical items 62, 64, 66 from display and controls the display to display the third layer graphical items 91-96. This is illustrated in FIG. 8B.

Each graphical item 91-96 from the third layer relates to a different contact and is associated with a different contact data item. User selection of a graphical item 91-96 causes the processor 12 to respond by controlling the display 22 to display information from at least one of the data fields from an associated data contact item (for example, a telephone number).

Figure 8B:
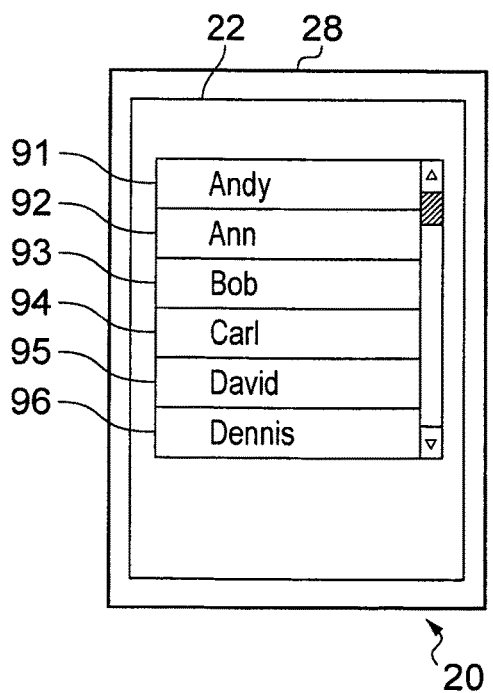
FIG. 8B illustrates an apparatus displaying a contacts list.

When the graphical items 62, 64, 66 from the second layer 200 of the menu system 300 are displayed (as illustrated in FIG. 8A), rather than selecting a graphical item 62, 64, 66, a user may provide a different form of user input to cause the processor 12 to respond in a different manner to that illustrated in FIG. 8B. For instance, example, a user may identify a graphical item 62, 64, 66 by touching the display 22, at the graphical item 62, 64, 66, for less than the threshold period of time and then tilt the apparatus 20, changing its inclination. The processor 12 responds by controlling the display 22 to display an indication of some or all of the contact data items associated with the identified graphical item 62.

In this example, the processor 12 responds to the change in inclination by controlling the display 22 to display three graphical items 82, 84, 86. The three graphical items 82, 84, 86 represent an indication of at least some of the contact data items associated with the contacts list graphical item 62. In this example, the displayed "indication" for each contact data item is the image linked to that contact data item. The first graphical item 82 includes an image of the contact 'Andy', the second graphical item 84 includes an image of the contact 'Carl', and the third graphical item 86 includes an image of the contact 'Ann'.

The graphical items 82, 84, 86 indicating the associated contact data items are displayed in visual association with the contacts list graphical item 62. In the FIG. 8C example, the graphical items 82, 84, 86 are displayed in visual association by displaying the graphical items 82, 84, 86 adjacent to the contacts list graphical item 62. There is an overlap between each of the graphical items 82, 84, 86 and the contacts list graphical item 62. The graphical items 82, 84, 86 are distributed around a perimeter of the contacts list graphical item 62.

Advantageously, since the graphical items 82, 84, and 86 are displayed in visual association with the contacts list graphical item 62, the user intuitively associates the graphical items 82, 84, 86 with the contacts list graphical item 62.

In some embodiments of the invention, the processor 12 may perform a decision process to determine which images to display in the graphical items 82, 84, 86. For example, only images of the user's favorite contacts may be displayed.

Each of the graphical items 82, 84 and 86 may be individually selectable. For example, the processor 12 may respond to selection of one of the graphical items 82, 84, 86 by providing the user with an option to call the displayed contact.

In some embodiments of the invention, it may not be necessary for a user to provide user input identifying the contacts list graphical item 62 as well as tilt input. Instead, the processor 12 may respond to tilt input by controlling the display 22 in the manner illustrated in FIG. 8C.

Figure 8C:
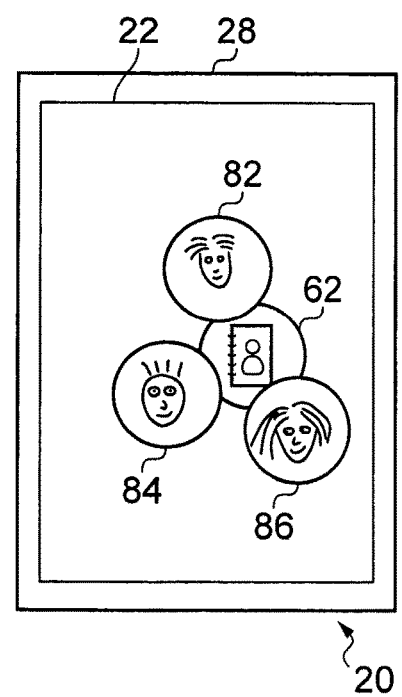
FIG. 8C illustrates an apparatus displaying images of contacts.

The embodiments of the invention described in relation to FIGS. 8A to 8C are similar to the embodiments of the invention described in relation to FIGS. 4A to 7 in that, in both sets of embodiments, the processor 12 responds to a change in inclination of the apparatus 20 by controlling the display 22 to display an indication of items associated with a displayed graphical item. In the FIG. 4A to 7 embodiments, the processor 12 indicates which graphical items would be displayed if the user were to move to the next layer of the menu system 300. In the FIG. 8A to 8C embodiments, the processor 12 provides an indication of associated (contact) data items.

FIG. 9A illustrates a further implementation of the invention. In FIG. 9A, the processor 12 may be configured to control the display 22 to display a plurality of graphical menu items 122-131. The graphical items denoted with the reference numerals 122, 128 and 131 each relate to one of the user's contacts. In this example, each of these graphical items 122, 128 and 131 includes an image of the relevant contact.

User identification of a particular one of the graphical items 122, 128, 131, followed by a change in inclination of the apparatus 20, may cause the processor 12 to respond by displaying a plurality of further graphical items in visual association with the identified graphical item. This is illustrated in FIG. 9B.

In FIG. 9B, the user has identified the graphical item 140 prior to tilting the apparatus 20. The processor 12 has responded by maintaining the identified graphical item 140 on the display 22 and by controlling the display 22 to display the further graphical items 141-149 in visual association with the graphical item 140 identified by the user. In this particular example, the further graphical items 141-149 are positioned around the perimeter of the identified graphical item 140. Each of the further graphical items 141-149 are positioned equidistantly from the identified graphical item 140.

Some or all of the further graphical items 141-149 may provide an indication of one or more data items that are associated with the identified graphical item 140. For instance, in this example, the image in graphical item 145 provides a visual indication of a stored video that is associated with the contact whose image is displayed in the identified graphical item 140.

In this example, selection of each of the further graphical items 141-149 causes the processor 12 to respond by performing a function that is associated with the contact illustrated in the identified graphical item 140. In the regard, the further graphical items 141-149 may function as 'shortcuts'. For instance, selection of graphical item 142 may cause the processor 12 to respond by initiating a telephone call to the contact illustrated in the identified graphical item 140. Selection of graphical item 145 may, for example, cause the processor 12 to respond by initiating playback of the video indicated by that graphical item 145.

References to 'a tangible computer-readable storage medium', 'a computer program product', a 'computer', and a 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIG. 7 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, according to some embodiments, a user provides a first type of input to select a graphical item and a second, different, type of input to identify that graphical item for preview. In the embodiments of the invention described above, the first type of input is a 'long touch' and the second type of input is a 'short touch'. In alternative embodiments of the invention, the first type of input may, for example, be a 'double touch' (in which the user touches the graphical item twice in quick succession) and the second type of input may be a 'single touch'. In further alternative embodiments of the invention, the processor 12 may differentiate between the first type of input and the second type of input in dependence upon the amount of force that is applied to a user input device by a user. In these embodiments, the user input device may comprise a force sensor that is configured to sense the amount of force that is applied by a user. The user input device that is used to sense the amount of force applied by the user may be part of a touch sensitive display. Alternatively, the different types of user input may be provided by actuating different keys in a keypad.

The shape of graphical items illustrated in the figures is substantially circular. However, this need not be the case. The graphical items could potentially be any shape or size.

It will also be appreciated by those skilled in the art that it may not be necessary for a user to physically touch the touch sensitive display 22 in order to provide user input. For example, in some embodiments of the invention, the touch sensitive display 22 may utilize capacitive sensing technology. In these embodiments, the touch sensitive display 22 may detect user input when a user places a digit close to, but not at, the touch sensitive display 22.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus, comprising:
   at least one processor; and
   at least one memory storing computer program instructions, the at least one processor being configured to execute the computer program instructions to cause the apparatus at least to perform:
   causing the apparatus to enter a first layer of a hierarchical menu system and controlling a display to display a plurality of graphical items, including a first graphical item, from the first layer of the hierarchical menu system, wherein:
   when a user selects the first graphical item with a first type of touch input, while the apparatus is in the first layer of the hierarchical menu system and the plurality of graphical items are displayed on the display, the apparatus enters a second layer of the hierarchical menu system, wherein entering the second layer of the hierarchical menu system comprises: removing the plurality of graphical items from the first layer of the hierarchical menu system from display, and displaying a plurality of further graphical items from the second layer of the hierarchical menu system that are associated with the first graphical item and subsequent user selection of a second graphical item from the plurality of further graphical items causes a first action to be performed; and when the user selects the first graphical item with a second type of touch input, different from the first type of input and further provides a tilt input within a time interval while the second type of touch input is maintained with the tilt input changing the inclination of the apparatus when the apparatus is in the first layer of the hierarchical menu system and the plurality of graphical items including the first graphical item are displayed on the display, the display is controlled to display an interactive preview in response to the combination of the second type of touch input and the tilt comprising both the plurality of graphical items including the first graphical item in the first layer all in an altered appearance and the plurality of further graphical items including the second graphical item from the second layer of the hierarchical menu system with the plurality of further graphical items including the second graphical item being concurrently displayed around a perimeter adjacent to the first graphical item that was selected with the second type of touch input, and user selection being permitted of any of the plurality of further graphical items such that user selection of the second graphical item from the plurality of further graphical items in the interactive preview, subsequent to the tilt input, causes a second action to be performed that is different from the first action;

wherein the altered appearance is indicated on the screen by a different color of all the plurality of graphical items in the first layer from the color of the graphical items prior to the transition to the interactive preview.

2. An apparatus as claimed in claim 1, wherein the display is a touch sensitive display and the at least one processor is configured to detect touch input, at the first graphical item, identifying the first graphical item for preview.

3. An apparatus as claimed in claim 1, wherein the at least one processor is configured to detect whether the change in inclination is above a threshold, and the at least one processor is configured to control the display to display the interactive preview in response to detecting that the change in inclination is above the threshold.

4. An apparatus as claimed in claim 1, wherein the first action that is caused to be performed by user selection of the second graphical item includes performance of a function associated with the second graphical item, and wherein the second action that is caused to be performed by user selection of the second graphical item includes a preview of the function associated with the second graphical item.

5. A method, comprising:
causing an apparatus to enter a first layer of a hierarchical menu system and controlling a display to display a plurality of graphical items, including a first graphical item, from the first layer of the hierarchical menu system, wherein:

when a user selects the first graphical item with a first type of touch input, the apparatus is in the first layer of the hierarchical menu system and the plurality of graphical items are displayed on the display, causing the apparatus to enter a second layer of the hierarchical menu system, wherein entering the second layer of the hierarchical menu system comprises: removing the plurality of graphical items from the first layer of the hierarchical menu system from display, and displaying a plurality of further graphical items from the second layer of the hierarchical menu system that are associated with the first graphical item and subsequent user selection of a second graphical item from the plurality of further graphical items causes a first action to be performed; and when the user selects the first graphical item with a second type of touch input, different from the first type of input and further provides a tilt input within a time interval the second type of touch input is maintained with the tilt input changing the inclination when the apparatus is in the first layer of the hierarchical menu system and the plurality of graphical items including the first graphical item are displayed on the display, the display is controlled to display an interactive preview in response to the combination of the second type of touch input and the tilt comprising both the plurality of graphical items including the first graphical item in the first layer all in an altered appearance and the plurality of further graphical items including the second graphical item from the second layer of the hierarchical menu system with the plurality of further graphical items including the second graphical item being concurrently displayed around a perimeter adjacent to the first graphical item that was selected with the second type of touch input, and user selection being permitted of any of the plurality of further graphical items such that user selection of the second graphical item from the plurality of further graphical items in the interactive preview, subsequent to the tilt input, causes a second action to be performed that is different from the first action;

wherein the altered appearance is indicated on the screen by a different color of all the plurality of graphical items in the first layer from the color of the graphical items prior to the transition to the interactive preview.

6. A method as claimed in claim 5, wherein the display is a touch sensitive display and user touch input is detected, at the first graphical item, identifying the first graphical item for preview.

7. A method as claimed in claim 5, wherein the first action that is caused to be performed by user selection of the second graphical item includes performance of a function associated with the second graphical item, and wherein the second action that is caused to be performed by user selection of the second graphical item includes a preview of the function associated with the second graphical item.

* * * * *

UNITED STATES PATENT AND TRADEMARK OFFICE
CERTIFICATE OF CORRECTION

PATENT NO. : 10,073,608 B2
APPLICATION NO. : 13/579453
DATED : September 11, 2018
INVENTOR(S) : Wang et al.

Page 1 of 1

It is certified that error appears in the above-identified patent and that said Letters Patent is hereby corrected as shown below:

In the Claims

Column 15,
Line 40, "detect touch input" should read --detect user touch input--.

Column 16,
Line 2, "type of touch input, the apparatus" should read --type of touch input, while the apparatus--;
Line 19, "a time interval the second type" should read --a time interval while the second type--.

Signed and Sealed this
Twelfth Day of March, 2019

Andrei Iancu
*Director of the United States Patent and Trademark Office*